US010610048B2

(12) United States Patent
Gaillard et al.

(10) Patent No.: US 10,610,048 B2
(45) Date of Patent: Apr. 7, 2020

(54) BEVERAGE PREPARATION MACHINE

(71) Applicant: NESTEC S.A., Vevey (CH)

(72) Inventors: Olivier Gaillard, Suchy (CH); Eckhard Seid, Estavayer-le-Lac (CH)

(73) Assignee: Societe des Produits Nestle S.A., Vevey (CH)

( * ) Notice: Subject to any disclaimer, the term of this patent is extended or adjusted under 35 U.S.C. 154(b) by 337 days.

(21) Appl. No.: 15/508,689

(22) PCT Filed: Sep. 1, 2015

(86) PCT No.: PCT/EP2015/069966
§ 371 (c)(1),
(2) Date: Mar. 3, 2017

(87) PCT Pub. No.: WO2016/034592
PCT Pub. Date: Mar. 10, 2016

(65) Prior Publication Data
US 2017/0273501 A1    Sep. 28, 2017

(30) Foreign Application Priority Data

Sep. 4, 2014  (EP) ..................... 14183561

(51) Int. Cl.
A47J 31/46    (2006.01)
A47J 31/60    (2006.01)
A47J 31/40    (2006.01)
(52) U.S. Cl.
CPC ............. A47J 31/46 (2013.01); A47J 31/407 (2013.01); A47J 31/60 (2013.01)

(58) Field of Classification Search
None
See application file for complete search history.

(56) References Cited

U.S. PATENT DOCUMENTS

| 2001/0000570 A1* | 5/2001 | Aarts ................... A47J 31/002 99/295 |
| 2004/0025701 A1* | 2/2004 | Colston ............... A47J 31/3628 99/279 |
| 2006/0090653 A1 | 5/2006 | McDuffie et al. |
| 2014/0242224 A1 | 8/2014 | Glucksman et al. |

FOREIGN PATENT DOCUMENTS

WO    2013041581    3/2013

* cited by examiner

Primary Examiner — Jenna A Watts
(74) Attorney, Agent, or Firm — K&L Gates LLP

(57) ABSTRACT

A beverage machine (300) comprises a pump (106) for pumping water (104) from a water tank (102) through a heater (108) and a hollow injection needle (200) into a beverage capsule (202), a pressurization device (302) comprising a cavity (304), a water line (116) connecting an outlet of the pump (106) to said cavity (304), a pressurization device valve (316) between the pump (106) and said pressurization device (302), a gas line (312) connecting the pressurization device (302) to said hollow injection needle (200), and a discharge valve (314), such that the pressurization device (302) receives a volume of water (104) from the pump (106) to compress a volume of gas (310) held in the cavity (304) of said pressurization device (302), and such that said compressed volume of gas (310) is discharged through the hollow injection needle (200) when the discharge valve (314) is opened.

10 Claims, 4 Drawing Sheets

BEVERAGE PREPARATION MACHINE

CROSS REFERENCE TO RELATED APPLICATIONS

The present application is a National Stage of International Application No. PCT/EP2015/069966, filed on Sep. 1, 2015, which claims priority to European Patent Application No. 14183561.1, filed on Sep. 4, 2014, the entire contents of which are being incorporated herein by reference.

FIELD OF THE INVENTION

The present invention concerns a machine for preparing beverages. More particularly, the present invention concerns a machine for preparing beverages by the injection of water into an ingredient package, comprising means for maintaining the functioning of this injection system. The present invention also concerns a method for the use of such a machine.

BACKGROUND OF THE INVENTION

In recent years, it has become well-known to prepare and serve beverages and other liquid food products by means of single-serving capsule-based beverage-dispensing systems. In such systems, a single-serving amount of at least one beverage ingredient, such as powdered or ground coffee, tea leaves, or cocoa powder, is provided in a single-use package, fabricated from e.g. plastic or aluminium, which is hermetically sealed to protect the beverage ingredient therein.

Such ingredient package may be a rigid or a semi-rigid capsule, a sachet, a soft pad, a pod, etc.

Such systems may also be adapted to provide servings of liquid or semi-liquid foodstuffs such as broth or baby formula; for the purposes of this document, the term "beverage" should therefore be understood as comprising any substantially-liquid alimentary substance.

To extract the beverage, the capsule is inserted into a beverage machine adapted to receive it in an ingredient package holder; the machine generally comprises a reservoir of water and means for heating the water, pressurizing it, and introducing it into the beverage package. The exact parameters of the process (e.g. temperature, water volume, injection pressure) are adapted to the type of beverage being prepared.

Upon being introduced into the package, the water mixes with the beverage ingredient and the resulting beverage is subsequently dispensed into a container for consumption. In this way, a single machine can provide single portions of a number of different beverages, on demand and with no substantial adaptation to pass from one type of beverage to another.

In many of these beverage-dispensing systems, the water is introduced into the ingredient package by means of a hollow needle. The needle pierces the ingredient package, such that during extraction a flow of water is conducted from the reservoir through the needle and into ingredient package. The flow of water mixes with the beverage ingredient to form the beverage, which is then drained from the package through at least one opening in the package provided for that purpose.

Needle-based systems permit the water to be injected at high pressures, which is advantageous in the preparation of certain beverages such as espresso coffee, or also beverages prepared on the basis of a water-soluble ingredient powder. In this last case, high velocity of the water entering into the ingredient package is beneficial to the dissolution as it enhances mixing between the soluble powder and the water. A powerful jet of water injected through the needle into the ingredient package reduces the risk of undissolved powder and subsequent clogging of the ingredient package and/or poor in-cup quality.

However, such systems also present certain disadvantages. At the end of the beverage preparation cycle, a small quantity of water remains in the needle. When hard water (i.e. water with a high content of dissolved minerals) is used, this small quantity of water remaining in the needle leaves deposits of lime scale on the interior surface of the needle as it dries. The interior diameter of the needle is thereby slowly reduced, reducing the rate at which water flows through the needle and diminishing the performance of the beverage machine. Over time, the risk of clogged needles increases, which prevents the injection of water into the ingredient packages and obligates repair or replacement of the beverage preparation machine.

This problem is particularly acute when heated ($\geq 60°$ C.) water is used in the beverage preparation machine, as is the case when preparing hot beverages such as coffee or tea. Heated water causes the minerals dissolved therein to accrete on the inside of the hollow injection needle faster, exacerbating the problem beyond the levels found in cold-water (or ambient-temperature water).

Certain other systems have attempted to remedy this. For instance, the document WO 2012/076483 describes a mechanical system which comprises a pin configured to be inserted into the injection needle when a beverage capsule is inserted and removed. Such a system will indeed remove accreted mineral deposits from the inside of the injection needle, however it does not preventively expel liquids that are present on the internal surface of the needle bore after each injection cycle. Its use further requires a number of specialized components, some of which may be small and delicate, rendering the machine less reliable and more expensive to manufacture.

It is thus an object of the present invention to resolve or ameliorate at least some of the issues mentioned above.

SUMMARY OF THE INVENTION

According, therefore, to a first aspect of the invention, there is provided a machine for preparing a beverage, comprising a water circuit including a water pipe, a water tank, a pump, a water heater, and a hollow injection needle, wherein the pump draws a volume of water from said water tank and conducts it through said water pipe towards said hollow injection needle, for injection into an ingredient package and mixing therein with said ingredient.

According to the invention, the machine further comprises:
  a pressurization device comprising a cavity;
  a water line extending from the water pipe, downstream the pump, towards said cavity of the pressurization device;
  a pressurization device valve disposed on said water line;
  a gas line extending from the pressurization device to said hollow injection needle; and
  a discharge valve disposed on the gas line;
  wherein, when the pump is active, said discharge valve is closed and a volume of water is conducted through said water line into the cavity and thereby compresses a volume of gas held therein; and when the pump is inactive, said pressurization device valve is closed and the compressed volume of gas is discharged through said discharge valve and said hollow injection needle.

Such a machine is advantageous in that it prevents the accretion of mineral deposits in the injection needle by discharging the compressed volume of gas through it and removing residual water therein. Once the preparation of the beverage is completed, the discharge valve opens to quickly discharge the compressed volume of gas through the hollow injection needle, expelling any liquid that may have been retained therein. In this way, any residual water or beverage present in the hollow injection needle is expelled, preventing the formation of scale therein.

Further, this expulsion of gas (preferably air) is achieved by using the pressure that is generated by the pump during the injection of the water into the ingredient package, to compress the gas that is eventually discharged through the hollow injection needle. Thus, the system requires no additional gas pump or other expensive or complex gas supply. The machine thus achieves these advantages with a high degree of simplicity, reliability, and efficiency.

Moreover, as the system has only a small number of components, the reliability of its operation and the cost of its implementation are minimal.

Thus, the stagnation of water within the hollow injection needle and accompanying mineral accretion therein is avoided, maintaining a consistently high level of performance and efficiency over the operating life of the machine.

In a possible embodiment, the pressurization device valve is a check valve biased so as to permit water to flow from said pump into said pressurization device when a pressure differential across said pressurization device valve is above a first pre-determined value.

This is advantageous in that such a check valve serves to retain any pressure that has accumulated within the pressurization device once the pump has been turned off, affording the user a greater degree of flexibility in the use of the machine in that the compressed volume of gas need not be discharged, the instant the pump is turned off. Further, the provision of the pressurization device valve as a check valve prevents backflow of water from the pressurization device.

In another possible embodiment, the machine further comprises an injection check valve disposed on the water pipe, downstream a junction between the water line and the water pipe, said injection check valve being biased to permit water to flow from said pump towards said hollow injection needle when a pressure differential across said injection check valve is above a second pre-determined value, said second predetermined value being higher than the first predetermined value set for the reference pressure differential of the pressurization device valve, as mentioned above.

This is advantageous in that the water provided by the pump flows only to the pressurization device up until the moment where the pressure of said flow of water reaches the second pre-determined value. In this way, the machine is configured to charge the pressurization device before the injection of water into the beverage capsule is commenced. The machine is thereby rendered more efficient and reliable.

In another preferred embodiment, the machine further comprises a separator disposed within the cavity of the pressurization device and forming a fluid-tight seal therewith, said separator thereby dividing the cavity of the pressurization device into a water chamber in water communication with the water line and a gas chamber in gas communication with the gas line.

Such a separator is advantageous in that it keeps the water and gas separate within the pressurization device, while still permitting the water to enter the pressurization device and compress the gas. In this way, any cross-contamination of the water and gas portions of the machine is prevented. The provision of a separator also enables higher pressures to be employed than without, as the dissolution of the gas into the water is avoided.

In one possible embodiment, the separator is a flexible membrane.

Such a separator is advantageous in that it is inexpensive and simple to implement.

In another possible embodiment, the separator is a spring-loaded piston.

A separator in a piston configuration is advantageous in that it may be displaced within its bore to a very high degree, permitting a high compression of the volume of gas within the pressurization device.

In an advantageous embodiment, the cavity comprises a water outlet for draining water from the cavity of the pressurization device back into the water tank.

Such a water outlet allows draining of the water that is conducted into the pressurization device during the operation of the machine and frees volume in the pressurization device for a new charge of gas to be introduced into the cavity thereof. In this way, the beverage machine can be reset for a subsequent use.

In a possible embodiment, a drain line extends from the water outlet and the water tank, and a drain valve is disposed on the drain line, the drain valve being opened after the compressed volume of gas is discharged.

This is advantageous because the water which is drained from the pressurization device is recaptured for use in a subsequent iteration of the beverage preparation cycle.

As an alternative to a water outlet which is a passive drainage device, water can be removed actively from the pressurization device after each cycle, by actuating the pump in reverse mode, so as to drain water from the cavity of the pressurization device through the water line, back into the water tank from which it was initially removed.

In another embodiment, a selection valve is disposed on said water circuit for opening or closing said water pipe and activating the pump when said water pipe is open.

In a second aspect, the invention is drawn to a process for preparing a beverage in a beverage machine as described above, comprising the steps of disposing an ingredient package in an ingredient package holder of said beverage machine; inserting the hollow injection needle of said beverage machine into said ingredient package; activating the pump, a first volume of water being thereby conducted from the water tank into the cavity of the pressurization device and compressing a volume of gas therein, and a second volume of water being conducted subsequently or concurrently from said water tank through the hollow injection needle into the ingredient package; deactivating the pump; and opening the discharge valve in the gas line, thereby discharging the volume of gas in the pressurization device through the injection needle.

In this way, the user of the machine prepares a beverage in such a way as to realize the advantages described in the foregoing discussion.

When the second volume of water is conducted into the beverage capsule subsequently to the first volume of water being conducted into the cavity of the pressurization device, the efficiency and reliability of the process is improved.

This is advantageous in that the volume of gas within the pressurization device is brought up to full pressure before the water is injected into the ingredient package to prepare the beverage.

When the second volume of water is conducted into the beverage capsule concurrently to the first volume of water being conducted into the cavity of the pressurization device, the overall time required for preparing the beverage is minimized.

In a possible embodiment, the process further comprises a step for withdrawing the hollow injection needle from the ingredient package, performed prior to the step for opening the discharge valve.

This is advantageous in that the compressed volume of gas will be discharged into the ambient environment, rather than into the ingredient package. This permits the machine to be used with ingredient packages which contain insoluble beverage ingredients (i.e. ground coffee or tea leaves) which might otherwise prevent the proper discharge of the compressed volume of gas.

In another possible embodiment, the process further comprises a step for withdrawing the hollow injection needle from the ingredient package, performed subsequent to the step for opening the discharge valve.

This is advantageous in that the discharge of the compressed volume of gas will be conducted while the hollow injection needle is still located within the ingredient package. Where the ingredient package contains soluble beverage ingredients (i.e. powdered milk or freeze-dried coffee), the discharge of the compressed volume of gas into the ingredient package will expel any traces of beverage that remain in the ingredient package after the completion of the injection. As a result, dripping of beverage from the ingredient package when it is removed from the machine is reduced.

In a possible embodiment, the process further comprises a step for draining at least some of the first volume of water from the cavity of the pressurization device, performed after the step for opening the discharge valve.

This is advantageous in that it will ready the pressurization device for a subsequent iteration of beverage preparation. Additionally, the draining of water from the cavity of the pressurization device can be used to inspire an additional volume of gas to replace that which was discharged through the hollow injection needle.

In a possible embodiment, the discharge valve is open during said draining step.

BRIEF DESCRIPTION OF THE DRAWINGS

Additional features and advantages of the present invention are described in, and will be apparent from the following figures given by way of non-limiting example.

DETAILED DESCRIPTION OF THE INVENTION

As used in this specification, the words "comprises", "comprising", and similar words, are not to be interpreted in an exclusive or exhaustive sense. In other words, they are intended to mean "including, but not limited to".

The invention is further described with reference to the following examples. It will be appreciated that the invention as claimed is not intended to be limited in any way by these examples.

Figure 1:
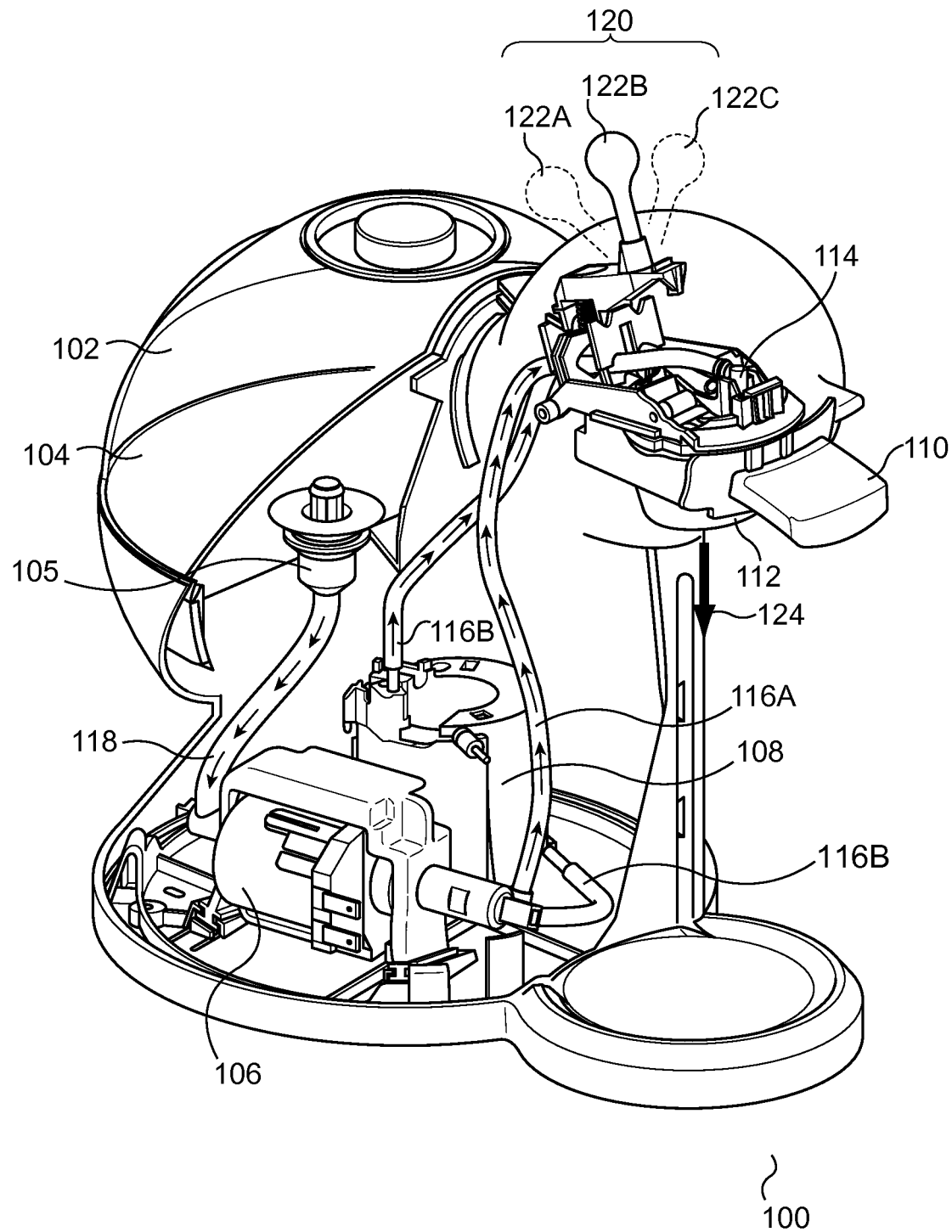
FIG. 1 is a partial cut-away depiction of a beverage preparation machine as known in the art.

FIG. 1 is a partial cut-away depiction of a beverage preparation machine 100 as is known in the prior art. The beverage machine 100 comprises a water circuit including a water tank 102, in which a volume of water 104 is kept, as well as a filter 105, a pump 106 and a heater unit 108. The pump is able to deliver a maximum output pressure comprised between 13 and 15 bar (pressure relative to the atmospheric pressure).

The beverage preparation machine 100 also comprises an ingredient package holder 110, depicted here in the closed position. The ingredient package is here, by way of non-limiting example, a beverage capsule (not depicted) which is held into the beverage capsule holder 110. The capsule holder 110 holds the beverage capsule in a depression 112 provided for that purpose, for instance of the type described in Applicant's European patent EP 1472156 B1. The beverage capsule is generally a hollow, cylindrical or frusto-conical container holding a portion of a beverage ingredient or ingredients sufficient for a single serving of beverage. Such beverage ingredients may include soluble ingredients such as powdered coffee, milk powder, sugar, or powdered cocoa; insoluble ingredients such as ground coffee or dried tea leaves; or other such ingredients or combinations of ingredients which produce a liquid alimentary product when reconstituted.

Once a beverage capsule is inserted into the depression 112 of the capsule holder 110, the capsule holder 110 is slid into place in the machine 100 as shown in FIG. 1. A plate 114 comprises a hollow injection needle (not shown), which is disposed such that when the plate 114 is placed on the beverage capsule, the injection needle pierces the beverage capsule and protrudes into the interior thereof. When the machine is in a functional configuration, the capsule holder 110 contains a capsule and is inserted into the machine, and the needle plate 114 is moved towards the capsule holder 110 so as to close the latter, and such that the ingredient capsule is then contained in a closed brewing cavity wherein the brewing process takes place.

The hollow injection needle is in fluid communication with the pump 106 and the water heater 108 by means of the water pipe 116, which bifurcates in this example, into the water lines 116A and 116B. The water lines 116A and 116B define two alternative water paths to the injection needle, each corresponding to one possibility to use the beverage machine. In the first possibility, the user selects so-called "cold" water which is drawn from the water tank (at ambient temperature) and flows directly through the pump 106 to the injection needle. The selection between "cold" and "hot" water is performed by manually basculating the lever 122 between its neutral position 122B wherein the pump is stopped and a selection valve 120 is closed, and respectively the "hot" position 122A or the "cold" position 122C, as illustrated in FIG. 1. The pump 106, in turn, draws water 104 from the water tank 102 through the feed line 118. During operation, the pump 106 draws a flow of water 104 from the water tank 102 and ejects it at pressure through the water lines 116A or 116B.

An example of the general configuration and principle of operation of the beverage machine 100 in general; and in particular of the loading of a beverage capsule into the capsule holder 110, and of the correct sealing of the beverage machine with the beverage capsule is described in Applicant's European patent EP 1967099 B1.

The water line 116A conducts the water directly from the pump 106 to the hollow injection needle, thereby preparing a room-temperature beverage. Conversely, the water line 116B conducts the water 104 from the pump 106 through the water heater 108 before delivering it to the hollow injection needle, thereby heating the water 104 to prepare a hot beverage 124 (about 100° C. in most instances).

In the machine as illustrated in FIG. 1, there is provided a selection valve 120, mobile between the positions 122A, 122B, and 122C as described above, which selectively blocks off fluid communication between the water lines 116A and 116B and the injection needle. To prepare a hot beverage, the selection valve 120 is placed in the position 122A to block the water line 116A and open water line 116B, such that only the heated water 104 flowing through water line 116B is injected into the beverage capsule. Conversely, to prepare a cold beverage 124, the selection valve 120 is placed in the position 122C to block the water line 116B, such that the water 104 flows through water line 116A directly from the pump into the beverage capsule, not passing through the water heater 108. And when the selection valve 120 is placed in the position 122B, both water lines 116A and 116B are closed and the pump is stopped. In the embodiment of the machine represented in FIG. 1, the valve 120 is a peristaltic valve of the type described in Applicant's European patent EP 2162653 B1. With such a peristaltic valve, when the position lever 122 is placed in its neutral position 122B, both water lines 116A and 116 B are closed, such that no water passes through the injection needle. Furthermore, the valve 120 comprises an electrical switch (not illustrated in FIG. 1), which commands the actuation of the pump; in position 122B of the valve, the pump is stopped, whereas if the user pivots the lever 122 in either its position 122A or its position 122C, the switch is also actuated and the pump is turned on. As an alternative to a manual lever 122 described above, the beverage machine can comprise an automated valve actuation, wherein the valve is turned between its various positions by means of a motorized device. In this case, the selection is made by the user pressing corresponding "hot" or "cold" buttons on a control panel of the machine.

Figure 2:
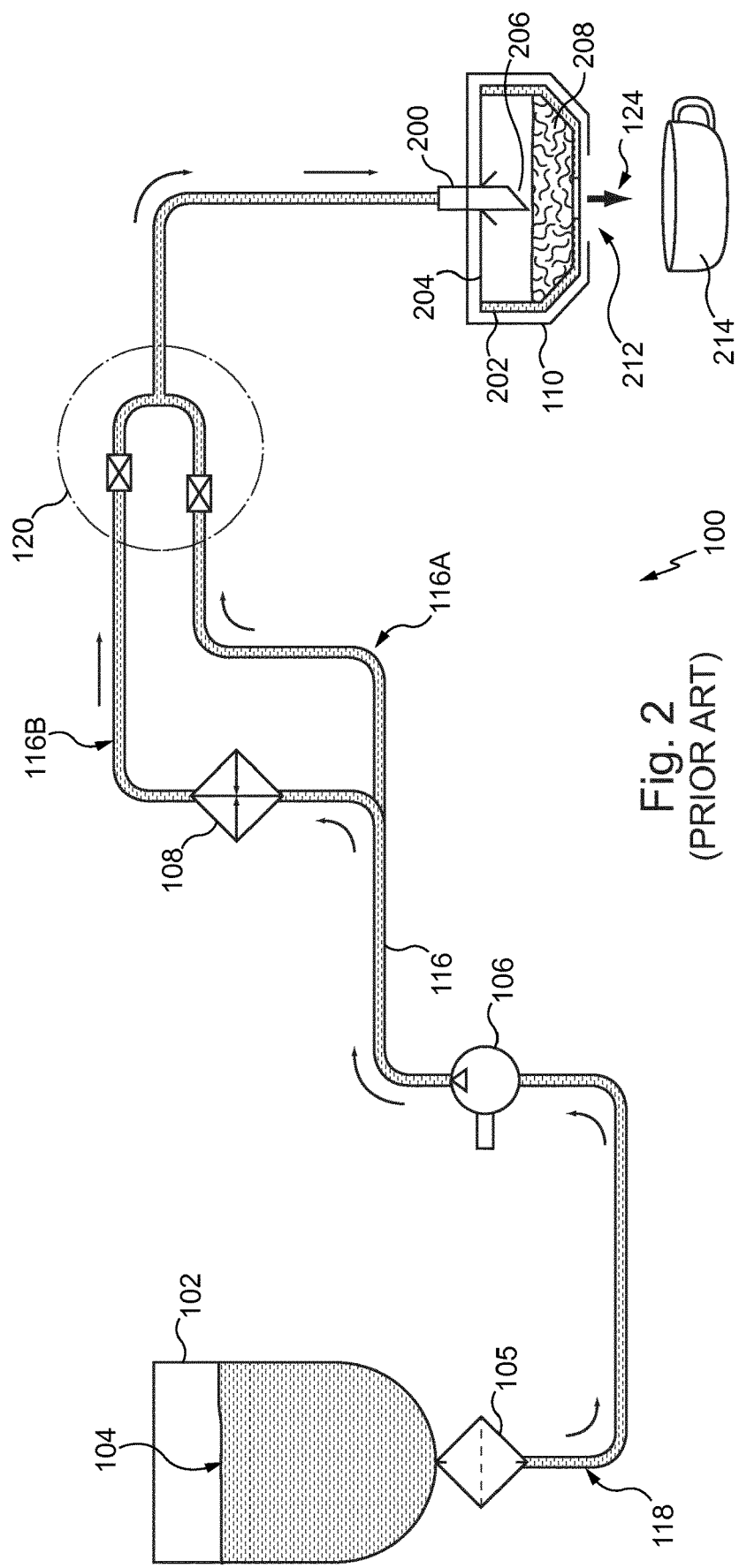
FIG. 2 is a schematic depiction of the beverage machine of FIG. 1.

FIG. 2 is a schematic view of the beverage preparation machine 100 depicted in FIG. 1. In FIG. 2, it is seen that the hollow injection needle 200 pierces the ingredient package, here the beverage capsule 202, through its cover 204, the latter having been disposed in the capsule holder 110 as described above. Depending on the particular aspects of the machine, either or both of the hollow injection needle 200 and the capsule holder 202 may be made mobile so as to permit the insertion and removal of the beverage capsule 202.

During the preparation of a beverage, the water 104 that is drawn from the reservoir 102 is pressurized by the pump 106, then optionally passed through the heater 108 and the water lines 116A or 116B as described above, to the hollow injection needle 200. The flow of water 104 exits the hollow injection needle 200 through its tip 206, mixing with the beverage ingredient 208 which is disposed within the cavity 210 of the beverage capsule 202. The resulting beverage 124 then drains from the beverage capsule 202 through the drain hole 212 and into the container 214—for instance a cup—for consumption.

Upon completion of the preparation of the beverage, the pump 106 is shut off, relieving pressure within the water lines 116A, 116B; however, a small quantity of water remains in the hollow injection needle 200.

Figure 3:
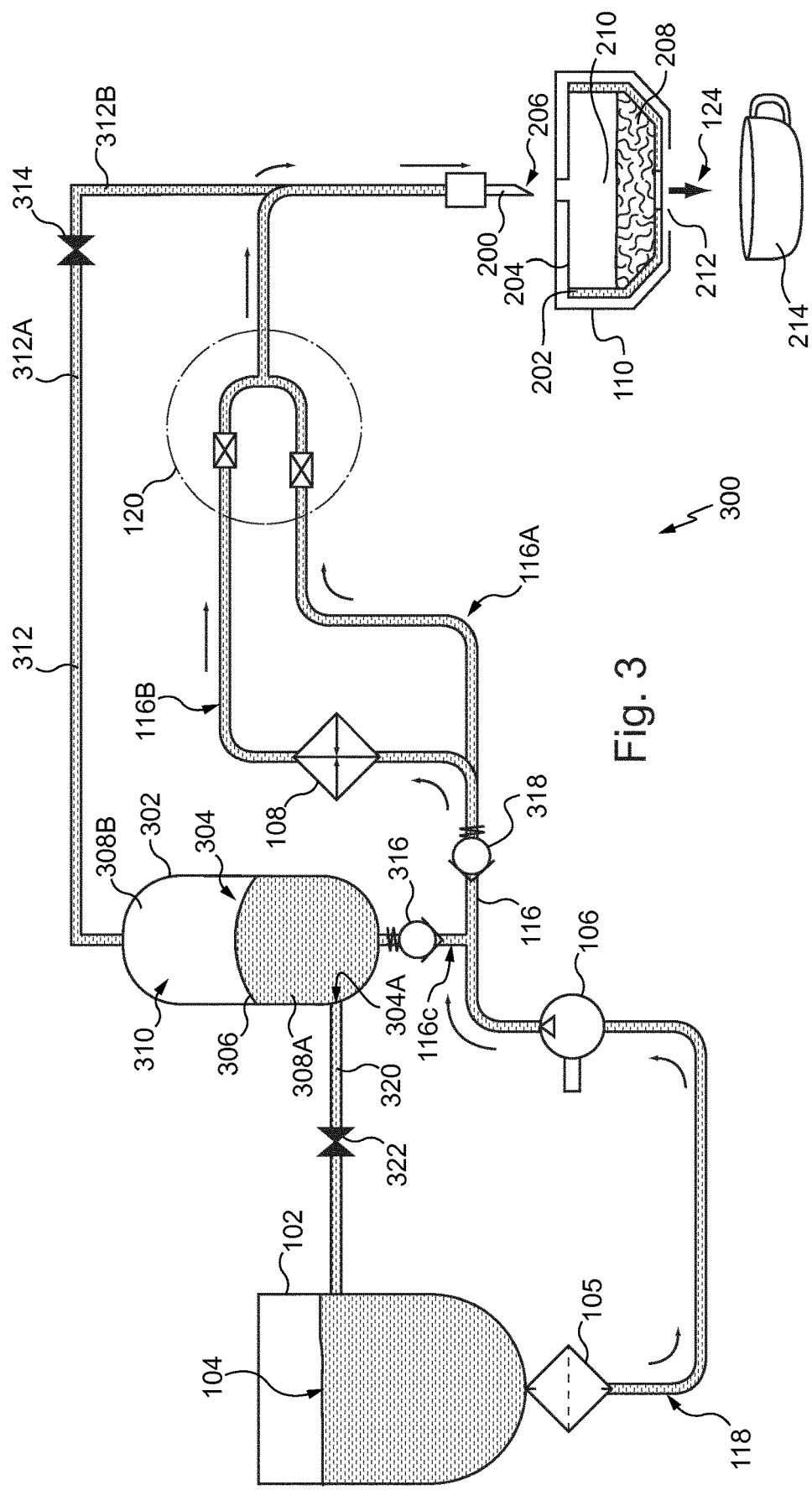
FIG. 3 is a schematic depiction of a beverage machine according to an embodiment of the invention, during the preparation of a beverage.

FIG. 3 is a schematic depiction of a beverage machine according to an embodiment of the present invention, during the preparation of a beverage. As in the prior art machine 100 presented in the previous figures, the machine 300 comprises a water pipe 116, a water tank 102, in which a volume of water 104 is kept, a pump 106 and a water heater 108, connected by the feed line 118 and the water lines 116A and 116B.

Here, the machine also includes a filter 105 on the water circuit. The filter is typically a metallic mesh filter, able to retain particles within the water tank whose size exceeds about 100 microns. The filter 105 is optional.

A selection valve 120 disposed on the water circuit is activated for opening or closing the water pipe 116 and activating the pump 106 when the water pipe is open.

To prepare a beverage, the beverage capsule 202 is first disposed in the capsule holder 110 of the machine 300. The hollow injection needle 200 is then made to pierce the cover 204 of the beverage capsule 202, thereby protruding into the cavity 210 of the beverage capsule.

The machine 300 further comprises a pressurization device 302. The pressurization device 302 is provided as a hollow, generally cylindrical device, enclosing a cavity 304. In this embodiment, the pressurization device 302 is further provided with a separator: the flexible membrane 306, which divides the cavity 304 into a water chamber 308A and a gas chamber 308B.

Of course, it will be understood that the pressurization device may, in other embodiments, be configured in a different manner, while still realizing the desired technical effect. For instance, the pressurization device may be provided as a simple chamber, without any membrane or other separation device. In such a pressurization device, the incoming water forced under pressure into the cavity of the pressurization device compresses the gas contained therein directly.

In another possible embodiment, the pressurization device is provided as a spring-loaded piston mobile in an appropriately-configured bore forming the cavity of the pressurization device. Such an embodiment may be advantageous in that it can achieve a greater degree of compression of the gas than may be possible with other configurations. The person of skill in the art will be readily capable of determining the most advantageous configuration for the application in question, and of adapting it for correct operation of the beverage machine.

The flexible membrane 306 is preferably fabricated from an elastic, non-permeable substance such as rubber, and sealed to the inside of the cavity 304 of the pressurization device 302 such that fluid communication between the two chambers 308A and 308B within the cavity 304 of the pressurization device 302 is prevented.

A water line 116C extends from the water pipe 116, at a junction downstream the pump 106, towards the cavity 304. In this embodiment, the water line 116C and the water pipe 116 are connected at a T-junction downstream the pump 106.

The water chamber 308A is thus in fluid communication with the water pipe 116, such that when the pump 106 is operating (as during the preparation of a beverage), the water chamber 308A receives a portion of the pressurized flow of water 104 (the remainder thereof being conducted through the hollow injection needle 200 into the beverage capsule 202 as heretofore described).

The gas chamber 308B is in fluid communication with the hollow injection needle 200 through the gas line 312. The gas line 312 is provided with a discharge valve 314, which serves to divide the gas line 312 into an upstream portion 312A and a downstream portion 312B. During the injection of the water 104 into the beverage capsule 202, the discharge valve 314 is maintained in a closed position.

It should be noted that the feed line 118, the water pipe 116 and the water lines 116A, 116B, and 116C are intended to contain water only. Likewise, the upstream portion 312A of the gas line 312 is intended to contain gas only. The downstream portion 312B of the gas line 312 may contain water, gas, or a mixture thereof depending on the phase of the beverage preparation cycle (this will be discussed in further detail below).

Thus, the entry of the water 104 into the water chamber 308A of the pressurization device 302 deflects the flexible membrane 306 into the gas chamber 308B, compressing the volume of gas 310 situated therein. The inlet of the water chamber 308A is provided with a pressurization device valve 316, which prevents the water 104 from returning to the tank 104 through the feed line 118 when the pump 106 is shut off. Said pressurization device valve 316 combined with the closed discharge valve 314, serves to maintain the pressure of the compressed gas 310 within the gas chamber 308B of the pressurization device 302 and the upstream portion 312A of the gas line 312. The gas pressure within the gas chamber of the pressurizing device and within the upstream portion 312A of the gas line 312 is equivalent to the lowest pressure chosen between: the output pressure of the pump, or the opening pressure of the valve 314.

In this embodiment, the pressurization device valve 316 is a spring-biased check valve, configured to permit water flow in only one direction (here, from the pump 106 to the water chamber 308A), only when the pressure differential across said pressurization device valve 316 is above a first predetermined value. This value is generally adapted to the particulars of the application for which the machine is to be utilized; in this embodiment, a cracking reference pressure between 1 and 3 bar inclusive for the pressurization device valve 316 is preferred. This pressure is chosen to be low enough that entry of the water 104 into the pressurization device 302 is relatively unrestricted, but at the same time the water 104 is prevented from leaving the pressurization device 302 and depressurizing the volume of gas 310 by the closure of the pressurization device valve 316.

Of course, in other embodiments, the pressurization device valve may be of a different type or configuration. For instance, the pressurization device valve may be a simple piloted valve, triggered by pilot lines in the case of a purely hydropneumatic valve, or by pressure sensors and servomotors in the case of an electromechanically-operated valve. Such an arrangement may offer functionality beyond the simple one-way operation furnished by an ordinary check valve.

Such valves offer an increased amount of flexibility in configuring the system and its operation, while the simple biased check valve depicted in this embodiment is inexpensive and reliable to furnish. The person of skill in the art will be capable of determining which is most appropriate for the particular implementation in question.

Returning now to the embodiment presented in FIG. 3, the water pipe 116 is provided with an injection check valve 318. The injection check valve 318 is a spring-biased check valve, which opens once the pressure in the water line rises above a second pre-determined value, and which blocks flow in the reverse direction (i.e. from the hollow injection needle 200 to the pump 106). This second pre-determined value pertaining to the injection check valve 318 is preferably greater than the first pre-determined value pertaining to the pressurization device valve 316. This has the effect of conducting the water from the pump 106 first into the pressurization device 302, bringing the gas 310 within the pressurization device 302 up to pressure before any water 104 is introduced into the cavity 210 of the beverage capsule 202 through the water circuit lines 116A or 116B. In the present application, this second pre-determined pressure is between 1.5 and 4 bars, inclusive, though it will be understood that this value may be varied according to the requirements of any particular application.

As a result of the above described structure, during the preparation of the beverage 124 when the user pivots the actuating lever of the valve 120, the pump 106 draws a volume of water 104 from the tank 102 and conducts it under pressure through the water line 116. As mentioned above, the maximum pressure obtained within the water line as a result of the pump actuation is 15 bar, however, this value may be lower, i.e. not higher than 8-10 bar; more preferably the output pressure of the pump that determines the water pressure in the water line 116 is comprised between 3 and 8 bar. A flow of water 104 under pressure is first conducted to the water chamber 308A of the pressurization device 302, pressurizing the volume of gas 310 in the gas chamber accordingly.

Once the pressure has accumulated within the cavity 304 of the pressurizing device 302 and the pressure differential across the injection check valve 318 has reached the second pre-determined value, the pressurization device valve 316 closes to keep the pressurizing device 302 and the upstream portion of the gas line 312A under pressure, whatever the possible later variations of pressure through the water circuit 116, 116a, 116B between the pump and the injection needle. The injection check valve 318 opens (it can open at the same time, or at a delayed time after the closing of the valve 316). The flow is now conducted through one of the water lines 116A or 116B as described above, depending on whether a cold (ambient), or hot beverage is to be prepared. The pressure of water that circulates from the pump to the injection needle in order to be injected into the ingredient capsule, and in particular through any one of the water lines 116A or 116B is provided by said pump according to the maximum pressure that is needed during the extraction; typically, this pressure is comprised between 1 and 15 bar, preferably between 2 and 12 bar, and more preferably it is adjusted depending on the type of ingredient to be extracted or dissolved in the capsule, and is comprised between 2 and 4 bar for the preparation of beverages from soluble ingredients such as milk, coffee, tea or chocolate powders, and between 5 and 12 bar for extraction of non-soluble ingredients such as roast and ground coffee. This pressure is generally determined by the pressure necessary to open the capsule and dispensing the coffee. In case the capsule contains a soluble ingredient (which required less pressure within the capsule to be dissolved, compared to non-soluble ingredients), the capsule opens at a pressure of e.g. 4 bar, such that the water pressure within the water circuit 116, 116A, 116B between the pump and the capsule cannot exceed 4 bar during the circulation of water from the pump to the capsule for extraction of a beverage. In this case, closing the pressurizing device valve 316 before the circulation of water from the pump, through the water circuit, to the capsule begins, is an advantage in that allows to differentiate clearly the use of the output pressure of the pump between a first step where the maximum output pressure of the pump can be used (up to 15 bar in this embodiment) for pressurization of the gas, and then a lower output pressure of the pump that is determined by the opening pressure of the capsule (about 4 bar in this example).

The water 104 is then conducted through the hollow injection needle 200 into the beverage capsule 202 to mix with the beverage ingredient 208 and produce the beverage 124. The downstream portion 312B of the gas line 312 is thus filled with water 104, as it is in fluid communication with the hollow injection needle 200.

Of course, in other embodiments the machine may be configured to pressurize the cavity of the pressurization device and inject the water into the beverage capsule simultaneously, or at least concurrently, as may be judged most appropriate for that particular application.

In order to drain water from the cavity 304, a water outlet 304A is provided in a wall of the cavity 304, preferably at the bottom of the cavity 304. The water outlet 304A is in water communication with a drain line 320.

The drain line 320 is provided between the water chamber 308A of the pressurization device 302 and the tank 102, and a drain valve 322 is disposed on the drain line 320. The drain valve 322 is, during the preparation of the beverage, disposed in the closed position so as to block fluid communication along the drain line 320. After the compressed volume of gas 310 is discharged, the drain valve 322 is opened in order to drain water from the cavity 308. Opening of the drain valve is actuated either purely mechanically by setting its opening pressure according to a predetermined value beyond which it opens (e.g. 1 bar relative pressure), said opening reference pressure being taken within the water chamber 308A of the pressurizing device. In such a configuration, when the valve 314 opens to let pressurized gas from the pressurizing device to the needle 200, pressure within the water chamber 308A decreases due to water expanding into the pressurizing device to balance the loss of gas pressure therein. When water pressure decreases below a predetermined pressure value, the drain valve 322 opens to drain water from the pressurizing device back into the water tank 102.

As an alternative, the opening and closing of the drain valve 322 can be piloted electronically by a program stored in the chip board of the beverage machine, in reference to the sequence of opening and closing of the other valves of the system, and according to the functioning principles of the present invention. In this case, all valves of the system are preferably electro-mechanically actuated, and all piloted according to a sequence that is contained in the functioning program of the machine.

Figure 4:
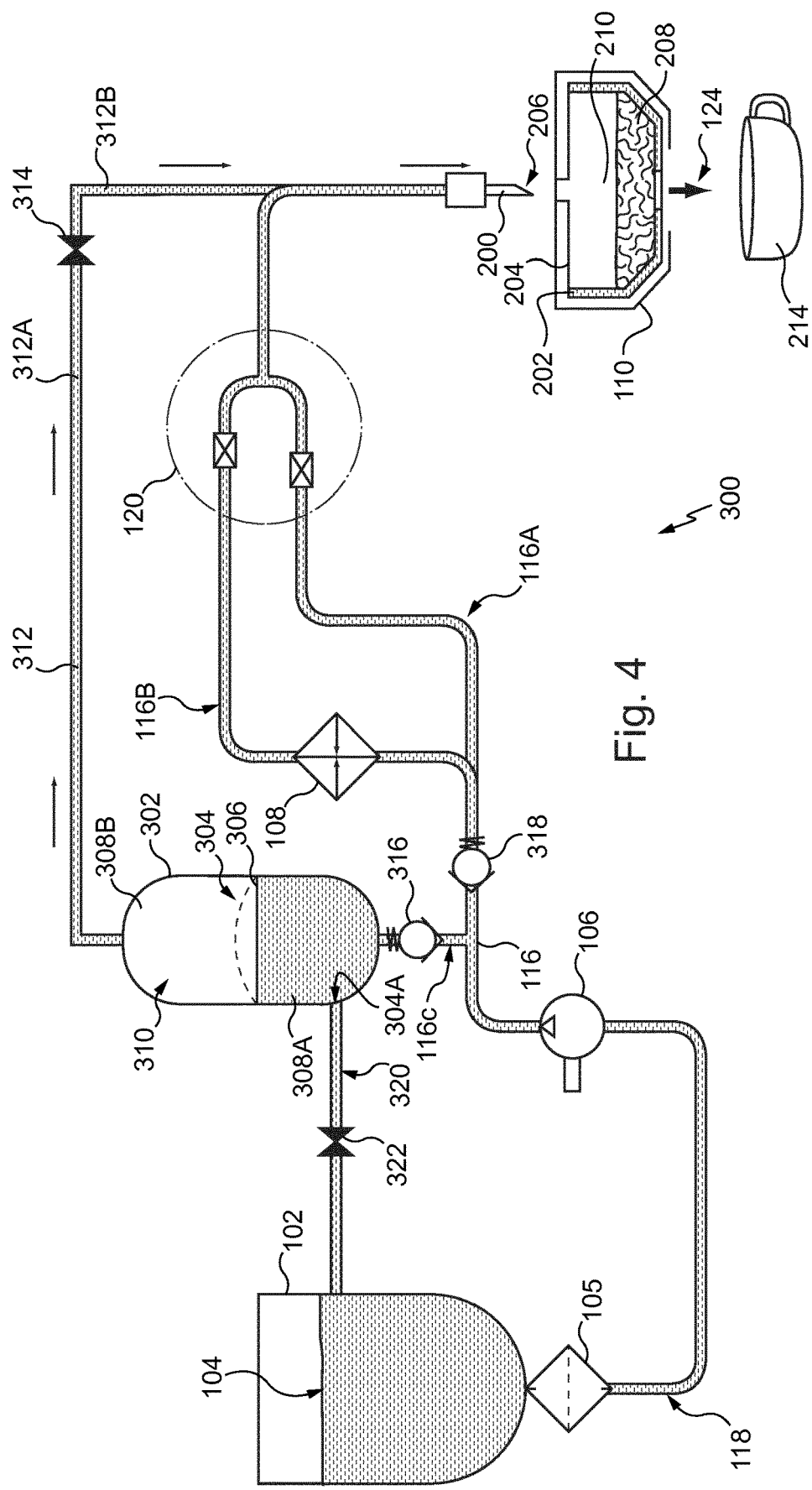
FIG. 4 is a schematic depiction of a beverage machine according to an embodiment of the invention, during a discharge of a volume of gas.

FIG. 4 is a schematic depiction of a beverage machine according to the invention, during a discharge of a volume of gas. This discharge occurs after the conclusion of the preparation of a beverage, when the pump 106 has been stopped and thus the water lines 116A, 116B, 116C and 118 are no longer pressurized and no water 104 flows from the tank 102.

First, the discharge valve 314 is opened, causing the pressurized gas 310 within the gas chamber 308B and upstream portion 312A of the gas line 312 to rush out through the downstream portion 312B and through the hollow injection needle 200, as indicated with arrows along the gas line 312 in FIG. 4. This has the effect of blowing out any liquid remaining in the upstream side 312B and the hollow injection needle 200, as indicated in FIG. 4.

In the present embodiment, the discharge of the gas 310 is conducted while the hollow injection needle 200 is still disposed within the beverage capsule 202. This has the effect of expelling any remaining beverage 124 which may still be present in the capsule, maximizing the yield thereof.

However, in alternate embodiments, the gas may be discharged through the injection needle during or after the removal of the hollow injection needle from the beverage capsule. This may be necessary when the beverage capsule contains insoluble beverage ingredient(s) such as ground coffee or tea leaves, which might interfere with the proper discharge of the gas through the hollow injection needle.

Likewise, depending on the means by which the discharge valve is operated, it may be possible in certain embodiments to base the timing of the discharge of the compressed volume of gas upon the contents of the beverage capsule.

For instance, when the discharge valve is electromechanically-operated, there may be furnished an RFID tag reader in the capsule holder 110 that is configured to read an RFID tag integrated into the beverage capsule, which is encoded with instructions to e.g. perform the discharge step after the hollow injection needle is withdrawn from the spent beverage capsule. Such instructions may optionally be comprised in a larger set of instructions coded into the RFID tag which also define other parameters of the beverage preparation process such as water temperature, water volume, water pressure, and the like.

Furthermore, the exact means of triggering the operation of the discharge valve 314 may be adapted to the particular beverage machine in question. In certain embodiments, a simple mechanical linkage may be employed, for instance configured to close the discharge valve 314 when the hollow injection needle 200 is inserted into a beverage capsule, and open the discharge valve 314 when the hollow injection needle 200 is withdrawn from a beverage capsule.

For instance, this action may also be combined with the opening and closing of a capsule receptacle in the machine itself, notably as by a lever or handle, such that the discharge of the gas is synchronized with the ejection of the spent beverage capsules.

In other embodiments it may be preferable to employ other means, for instance a servomotor, of opening and closing the discharge valve 314, for instance when the machine 300 is configured to adjust the manner in which the gas 310 is discharged according to the composition of the beverage ingredient 208. The person of ordinary skill in the art will be readily capable of determining the optimal method for any particular implementation.

Following the discharge of the gas 310, the gas chamber 308B of the pressurization device 302 will be at ambient pressure. To return the pressurization device 302 to its initial state for a subsequent beverage preparation cycle, the drain valve 322 opens and the elastic membrane 306 is permitted to return to its resting state, as depicted in FIG. 4. As described above, opening of the drain valve can be piloted by a programed sequence embedded into the computer board of the machine, and depending on a timing, or on the opening and closing of the other valves, according to the sequence described above. In another possibility, the valve 322 opens when the pressure inside the pressurizing device decreases below a certain predetermined value, for instance below 0.5 bar. A portion of the water 104 present in the water chamber 308A is thereby returned to the tank 102 through the return line 320, readying the machine 300 for another iteration of the beverage preparation cycle.

Again, as with the discharge valve 314, the return drain valve 322 may be actuated by whatever means are most appropriate to the particular implementation, and the person of ordinary skill in the art will be readily capable of adapting the machine 300 accordingly.

Along with the drainage of the water 104 from the pressurization device 302, a volume of gas is caused to enter the pressurization device 302 so as to replace that which was discharged through the hollow injection needle 200. In certain embodiments (such as the present one), this is performed by maintaining the discharge valve 314 in an open position while the water 104 is drained from the pressurization device 302. Thus, the discharge valve 314 is open during the draining step. This embodiment is advantageous when gas is air. The draining of the water 104 creates a diminished pressure within the pressurization device, causing air to be aspirated through the hollow injection needle 200 and into the pressurization device 302. In alternative embodiments, additional gas inlet ports may be provided in the pressurization device and/or the gas line 312, provided with one-way valves permitting gas to flow into the pressurization device but not out.

In an alternative embodiment, the opening and closing of the pressurization valve 316 is synchronized with the activation of the pump. Thus, the selection valve 120, which activates the pump, is synchronized with actuating means of the pressurization valve 316 in order to open the pressurization valve 316 when the pump 106 is activated. During this first phase of the process, the discharge valve 314 and the drain valve 322 are close. As explained here below, the injection check valve is close or open. After a predetermined period, such as 5 seconds for example, the pressurized valve 316 is closed whereas the injection check valve is opened (if close previously) or remains opened for preparing the beverage. At the completion of the beverage, the pump is deactivated and the discharge valve 314 is opened in order to eject pressurized gas into the hollow ejection needle 200. The discharge of gas is obtained thanks to the pressure differential through the discharge valve 314 when the pump is inactive, that is due to the pressure differential between the upstream portion 312A of the gas line, in communication with the pressurization device, and the downstream portion 312B of the gas line, in communication with the atmosphere through the hollow injection needle 200. Of course, during the discharge step, the pressurization valve 316 is maintained close. Finally, the drain valve 322 is opened in order to drain back the water from the cavity 304 to the water tank 102: during the draining step, the discharge valve 314 remains open in order to have fresh air entering into the cavity 304 of the pressurization device.

It will be understood that various changes and modifications to the presently preferred embodiments described herein will be apparent to those skilled in the art.

For instance, other means for draining water from the pressurization device at the conclusion of the preparation of a beverage may be employed. In one such means, the water 104 is returned to the tank 102 by running the pump 106 in the reverse direction and ensuring that the selection valve 120 and/or the injection check valve 318 block fluid communication between the pump and the hollow injection needle 200. In such a case the pressurization device valve should not be provided not as a check valve, but as a simple on-off valve whose operation is linked (e.g. by a solenoid and an electronic control system) to the operation of the pump so as to open when the pump is placed into reverse operation.

Furthermore, alternative sources for the gas discharged by the pressurization device may, in certain applications, be desirable. Rather than inspiring a fresh charge of gas through the injection needle, as in the above-described embodiments, the gas may instead be provided by e.g. a filtering system or gas reservoir in fluid communication with the pressurization device; the person of ordinary skill in the art will be readily capable of configuring such a system.

Any reference to prior art documents in this specification is not to be considered an admission that such prior art is widely known or forms part of the common general knowledge in the field.

Finally, while this invention is generally intended for systems in which hot water is used for preparing the beverages, this disclosure should not be construed as implying that it is functional only with hot water systems. Rather, it should be understood that many different kinds of capsule-based beverage systems may benefit from its inclusion, whether or not they use heated water for preparing beverages.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

In a possible embodiment, the beverage machine could comprise more than one hollow injection needle, and for example two or three hollow injection needles.

In this case, the compressed volume of gas is discharged through all the hollow injection needles.

The invention claimed is:

1. A process for preparing a beverage in a beverage machine, the process comprising:
   disposing an ingredient package in an ingredient package holder of the beverage machine;
   inserting a hollow injection needle of the beverage machine into the ingredient package;
   activating a pump, a first volume of water being thereby conducted from a water tank into a cavity of a pressurization device and compressing a volume of gas therein, and a second volume of water being conducted subsequently or concurrently from the water tank through the hollow injection needle into the ingredient package, wherein the pressurization device comprises a water inlet fluidly connected to the hollow injection needle by a first flow path comprising one or more water lines, the pressurization device further comprises a gas inlet fluidly connected to the hollow injection needle by a second flow path comprising one or more gas lines, and the pressurization device further comprises a water outlet fluidly connected to the water tank by a drain line;
   deactivating the pump; and
   opening a discharge valve disposed on the one or more gas lines, thereby discharging the volume of gas in the pressurization device through the hollow injection needle.

2. The process according to claim 1, further comprising withdrawing the hollow injection needle from the ingredient package prior to the opening of the discharge valve.

3. The process according to claim 1, further comprising withdrawing the hollow injection needle from the ingredient package subsequent to the opening of the discharge valve.

4. The process according to claim 1, further comprising draining at least some of the first volume of water from the cavity of the pressurization device after the opening of the discharge valve.

5. The process according to claim 4, wherein the discharge valve is open during the draining of at least some of the first volume of water from the cavity of the pressurization device.

6. The process according to claim 1, wherein a pressurization device valve is disposed on the one or more water lines, wherein the pressurization device valve is a check valve biased so as to permit water to flow from the pump into the pressurization device when a pressure differential across the pressurization device valve is above a first pre-determined value.

7. The process according to claim 1, wherein the pressurization device valve is a piloted valve.

8. The process according to claim 1, wherein a separator is disposed within the cavity of the pressurization device and forms a fluid-tight seal within the cavity of the pressurization device, the separator thereby dividing the cavity of the pressurization device into a water chamber in water communication with the one or more water lines and a gas chamber in gas communication with the one or more gas lines.

9. The process according to claim 8, wherein the separator is a flexible membrane.

10. The process according to claim 8, wherein the separator is a spring-loaded piston.

* * * * *